United States Patent
Suh et al.

(10) Patent No.: US 8,435,690 B2
(45) Date of Patent: May 7, 2013

(54) FUEL CELL STACK WITH COOLANT PUMP AND FUEL CELL SYSTEM USING THE SAME

(75) Inventors: Jun-Won Suh, Yongin-si (KR); Seong-Jin An, Yongin-si (KR); Chi-Seung Lee, Yongin-si (KR); Jun-Young Park, Yongin-si (KR); Jin-Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 338 days.

(21) Appl. No.: 12/851,501

(22) Filed: Aug. 5, 2010

(65) Prior Publication Data

US 2011/0039179 A1 Feb. 17, 2011

(30) Foreign Application Priority Data

Aug. 17, 2009 (KR) .................. 10-2009-0075912

(51) Int. Cl.
*H01M 8/04* (2006.01)
*H01M 2/38* (2006.01)

(52) U.S. Cl.
USPC ........... 429/434; 429/436; 429/439; 429/455; 429/456

(58) Field of Classification Search ............ 429/433, 429/434, 436, 439, 443, 444, 452, 455, 456
See application file for complete search history.

(56) References Cited

U.S. PATENT DOCUMENTS 6,503,650 B1  1/2003  Yasuo et al.

FOREIGN PATENT DOCUMENTS

| JP | 59-134570 | | 8/1984 |
|---|---|---|---|
| JP | 63-294670 | | 12/1988 |
| JP | 09-312164 | * | 12/1997 |
| JP | 9-312164 | | 12/1997 |
| JP | 2001-15136 | | 1/2001 |
| JP | 2005-032707 | | 2/2005 |
| JP | 2007-323862 | | 12/2007 |
| JP | 208-027744 | * | 2/2008 |
| JP | 2008-027744 | | 2/2008 |
| KR | 1020060115111 A | | 11/2006 |

OTHER PUBLICATIONS

KIPO Office action dated Apr. 18, 2011, for Korean priority Patent application 10-2009-0075912, noting listed references in this IDS.
Patent Abstracts of Japan, and English machine translation of Japanese Publication 09-312164, listed above, 7 pages.
KIPO Notice of Allowance dated Aug. 30, 2011 issued in the priority Korean application No. 10-2009-0075912, 5 pps.

* cited by examiner

*Primary Examiner* — Raymond Alejandro
(74) *Attorney, Agent, or Firm* — Christie, Parker & Hale, LLP

(57) ABSTRACT

A fuel cell stack that includes: stacked cells that generate electricity; an exchange plate disposed at a first side of the stacked cells, having a channel in fluid communication with an injection flow path and a discharge flow path, which extend between the cells; and a pump that is disposed at an opposing second surface of the stacked cells, to force coolant (air) through the injection flow path, the exchange plate, and the discharge flow path.

17 Claims, 12 Drawing Sheets

FUEL CELL STACK WITH COOLANT PUMP AND FUEL CELL SYSTEM USING THE SAME

CROSS-REFERENCE TO RELATED APPLICATION

This application claims the benefit of Korean Patent Application No. 10-2009-0075912, filed Aug. 17, 2009, in the Korean Intellectual Property Office, the disclosure of which is incorporated herein, by reference.

BACKGROUND

1. Field

The described technology relates generally to a fuel cell stack and a fuel cell system.

2. Description of the Related Art

A fuel cell is a device that generates electric power, by electrochemically reacting a fuel (hydrogen or a reformate gas) and an oxidizing agent. The fuel cell directly reacts a fuel (hydrogen or a reforming gas) and an oxidizing agent (oxygen or air), which are continuously supplied from the outside, to produce electrical energy. The oxidizing agent is pure oxygen or air containing a large amount of oxygen, and the fuel may be pure hydrogen or a fuel containing a large amount of hydrogen that is generated by reforming a hydrocarbon fuel (LNG, LPG, $CH_3OH$).

A fuel cell may be classified as a polymer electrode membrane fuel cell (PEMFC) that reacts oxygen and a reformate gas having abundant hydrogen by reformate fuel, or a direct oxidation fuel cell that directly reacts a fuel with oxygen.

A fuel cell system includes a stack for generating electricity. The stack includes multiple unit cells stacked on one another. Each unit cell includes a membrane electrode assembly (MEA) and a separator (bipolar plate). The separator includes passages that supply hydrogen and oxygen to the MEA.

A fuel cell system generates heat by the oxidation/reduction reaction of hydrogen and oxygen. By sustaining the stack at an appropriate driving temperature, the stability of an electrolyte film is secured, and the performance of the electrolyte film is prevented from being degraded. For this purpose, the stack has a cooling passage extending there through. Air or cooling water flows through the cooling passage, thereby removing some of the heat generated within the stack.

When a temperature variation occurs at the inside of the stack, the condensation of water is increased at lower temperature portions thereof. Thus, a flooding phenomenon occurs. When the flooding phenomenon occurs, the movement of fuel or an oxidizing agent is disrupted, reducing the output of the stack.

The above information disclosed in this Background section is only for enhancement of understanding of the background of the described technology, and therefore, it may contain information that does not constitute prior art.

SUMMARY

The described technology has been made in an effort to provide a fuel cell stack and a fuel cell system including the same, where the temperature deviation of the fuel cell stack is reduced.

An exemplary embodiment of the present disclosure provides a fuel cell stack that is uniformly cooled, and another exemplary embodiment of the present disclosure provides a fuel cell system that is uniformly cooled.

An exemplary embodiment of the present disclosure provides a fuel cell stack including: a plurality of stacked cells that generate electricity by a reaction of a fuel and an oxidizing agent; an exchange plate that is disposed on a first surface of the stacked cells, having a channel that communicates with an injection and discharge flow paths formed between the cells; and a pump that is disposed on a second surface of the stacked cells, to force a coolant, such as air, through the injection flow path, the channel, and the discharge flow path.

According to various embodiments, the pump may include an injection fan that communicates with the injection flow path, to force coolant into the injection flow path, and a discharge fan that communicates with the discharge flow path, to force coolant through the discharge flow path. The injection fan and the discharge fan may rotate in different directions.

According to various embodiments, the injection flow path may be disposed adjacent to a portion of the stacked cells into which fuel is injected, the discharge flow path may be disposed adjacent to a portion of the stacked cells from which fuel is discharged in the cell, the injection fan may be disposed at a central portion of the fuel cell stack, and discharge fans may be disposed at both side portions of the injection fan.

According to various embodiments, a separation plate that extends away from the stacked cells, between the injection fan and the discharge fan. A surface of the separation plate may be curved towards the discharge fan, to direct coolant exhausted by the discharge fan away from the injection fan.

According to various embodiments, the pump may include an injection fan that communicates with the injection flow path, to force coolant into the injection flow path. The pump may include a discharge fan that communicates with the discharge flow path, to force coolant through the discharge flow path. The pump and the exchange plate may be disposed opposite to each other.

Another embodiment of the present disclosure provides a fuel cell system including: a plurality of stacked cells that generate electricity by a reaction of fuel and an oxidizing agent; an exchange plate that is disposed at a first surface of the stacked cells and that communicates an injection flow path and a discharge flow path that are formed between the stacked cells; a pump disposed on an opposing second surface of the stacked cells, that forces coolant into the injection flow path, the exchange plate, and the discharge flow path; and a fuel supply unit that supplies fuel to the fuel cell stack.

According to various embodiments, the fuel cell system may further include a reformer that is installed between the fuel supply unit and the fuel cell stack and that reforms the fuel into a reformate gas having abundant hydrogen, to supply the reformate gas to the fuel cell stack. The pump may include an injection fan that communicates with the injection flow path, to force coolant through the injection flow path and a discharge fan that communicates with the discharge flow path, to discharge coolant from the discharge flow path.

According to various embodiments, the injection flow path may be disposed adjacent to a portion of the stack into which fuel is injected, the discharge flow path may be disposed adjacent to a portion of the stack from which fuel is discharged. The injection fan may be disposed at a central portion of the fuel cell stack, and discharge fans may be disposed at opposing sides of the injection fan.

According to various embodiments, a separation plate may be installed between the injection fan and the discharge fan, having a surface that curves toward the discharge fan, to direct discharged coolant away from the injection fan. A circulation fan that communicates with the discharge flow path may be disposed within the exchange plate, to force coolant into the discharge flow path.

According to various embodiments, the pump may include an injection fan that communicates with the injection flow path, to force coolant into the injection flow path. The pump may include a discharge fan that communicates with the discharge flow path, to force coolant through the discharge flow path.

As described above, according to the present disclosure, by minimizing a temperature variation inside of the fuel cell stack, water condensation at the inside thereof is prevented and thus, the stability of operation can be improved.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
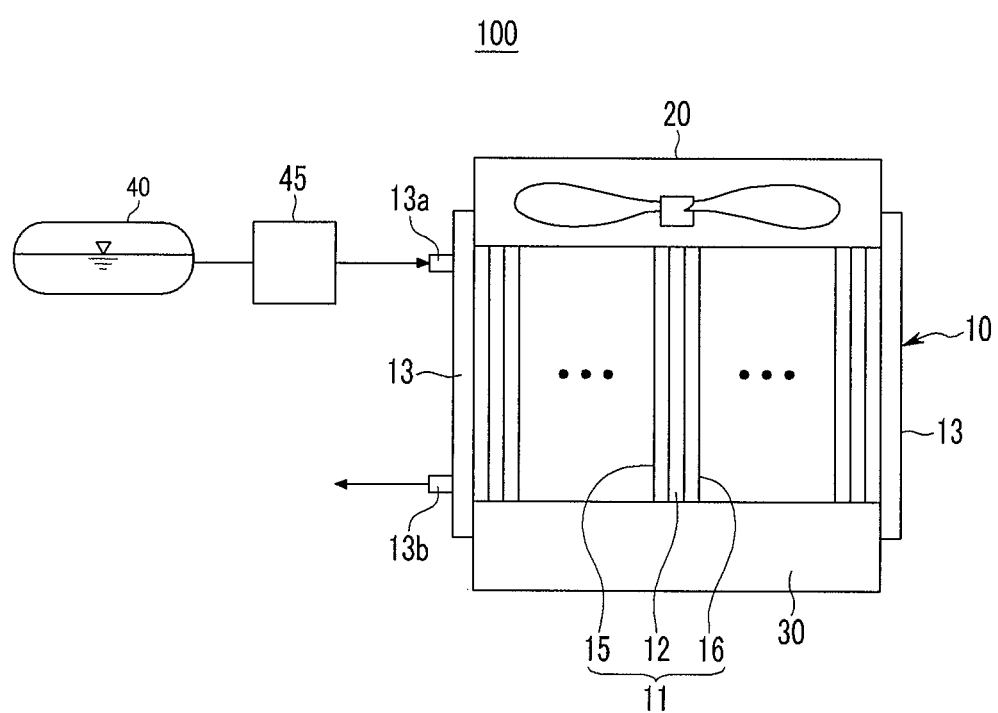
FIG. 1 is a schematic diagram illustrating an overall configuration of a fuel cell system according to a first exemplary embodiment of the present disclosure.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

FIG. 1 is a schematic diagram illustrating an overall configuration of a fuel cell system 100, according to an exemplary embodiment of the present disclosure. Referring to FIG. 1, the fuel cell system 100 includes a polymer electrode membrane fuel cell (PEMFC) that generates electrical energy, by electrochemically reacting hydrogen and oxygen.

However, the present disclosure is not limited thereto, as the fuel cell system 100 may be a direct oxidation fuel cell system that generates electrical energy through a direct reaction of a liquid or gas fuel and oxygen. Further, the fuel cell system 100 is an open cathode fuel cell system, and uses coolant (air) that is supplied by a pump as an oxidizing agent, without a separate oxidizing agent supply unit. Fuel that is used in the fuel cell system 100 may be a hydrocarbon fuel in a liquid or gas state, such as methanol, ethanol, natural gas, liquefied petroleum gas (LPG), gasoline, and butane gas.

The fuel cell system 100 includes a fuel cell stack 10 that generates electric power using fuel and an oxidizing agent, and a fuel supply unit 40 that supplies fuel to the fuel cell stack 10. The fuel cell system 100 further includes a reformer 45 that is installed between the fuel supply unit 40 and the fuel cell stack 10, to convert a fuel into a reformate gas having abundant hydrogen, and to supply the reformate gas to the fuel cell stack 10. The fuel supply unit 40 includes a fuel tank that stores a liquid or gaseous fuel. The reformer 45 may be a general reformer that is applied to a fuel cell system 100.

A pump 20 that supplies a coolant, such as air, which is an oxidizing agent, to cells 11 of the stack 10, is installed at a first side of the fuel cell stack 10. Herein, for convenience, the "coolant" may be referred to as "air" but is not limited thereto. The fuel cell stack 10 includes an exchange plate 30 having a channel to collect coolant (air) exhausted from some of the cells 11 and to direct the collected air to other ones of the cells 11. The exchange plate 30 is installed at a second surface of the stack 10 that is opposite to the first surface.

Figure 2:
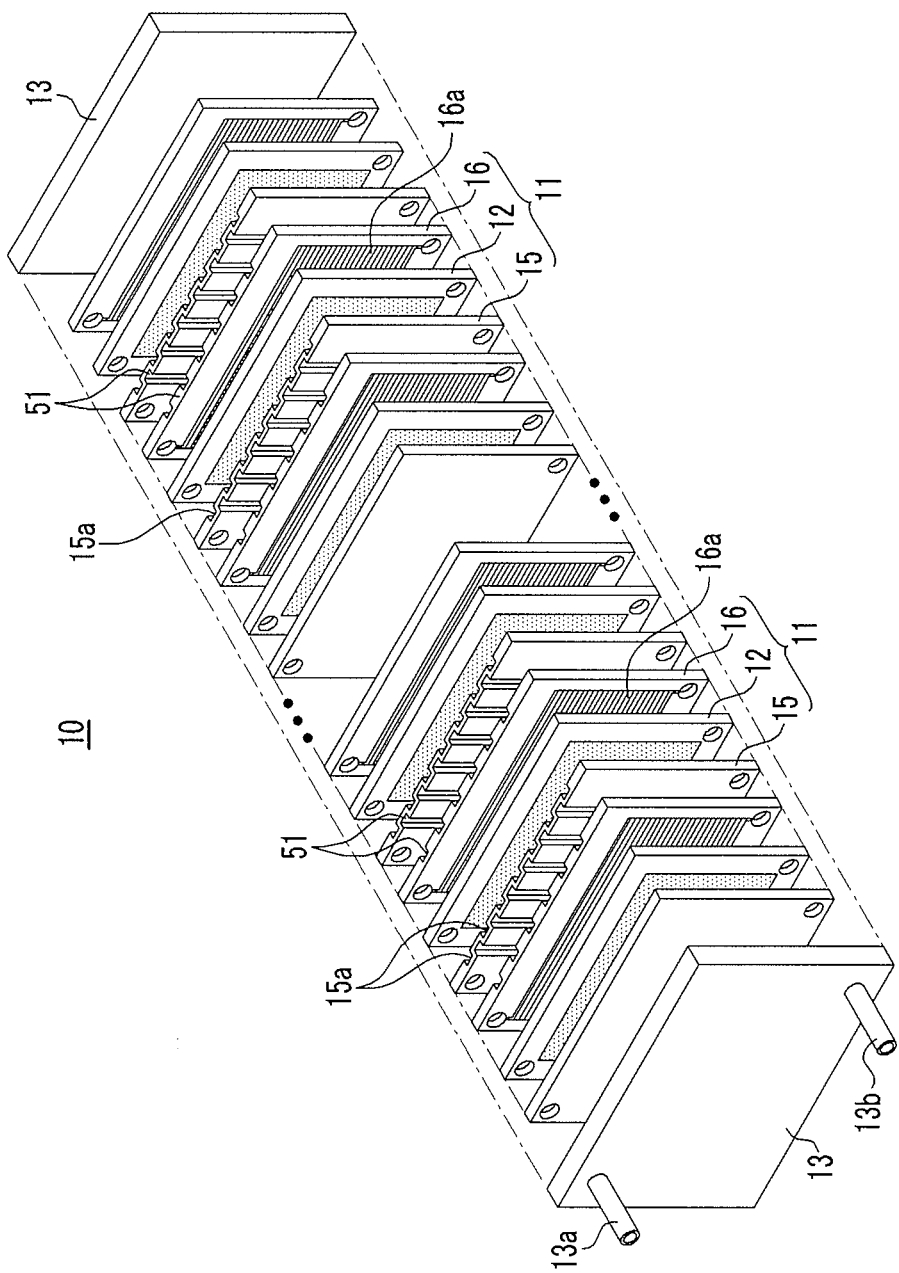
FIG. 2 is an exploded perspective view illustrating a part of a fuel cell stack that is shown in FIG. 1.

FIG. 2 is an exploded perspective view of the fuel cell stack 10 of FIG. 1. Referring to FIGS. 1 and 2, the fuel cell stack 10 includes a plurality of the cells 11.

Each cell 11 is a unit cell that generates electricity. Each cell 11 includes a membrane electrode assembly (MEA) 12, in which a fuel is oxidized by an oxidizing agent (air), and separators (bipolar plates) 15 and 16 that supply the fuel and oxidizing agent to the membrane electrode assembly 12. The membrane electrode assembly 12 is disposed between the separators 15 and 16. The membrane electrode assembly 12 includes an electrolyte film disposed between a cathode and an anode.

The separators 15 and 16 operate as conductors that are connected to the anode and cathode of the membrane electrode assembly 12, in series. The separator 16 (anode separator) has channels 16a that supply the fuel to the anode, extending in a first direction across the membrane electrode assembly 12. The cathode separator 15 has oxidizing agent flow channels 15a that supply air to the cathode, extending in a second direction, across the membrane electrode assembly 12.

Further, the anode separators 16 and the cathode separators 15 include a cooling flow path 51 through which a coolant (air) flows. The cooling flow path 51 is formed in opposing surfaces of the anode separators 16 and the cathode separators 15. The cooling flow path 51 includes channels formed in the anode separators 16 and opposing channels formed in the cathode separators 15, such that spaces (paths) are formed between the separators 15 and 16. The pump 20 forces coolant (air) through the oxidizing agent flow channels 15*a* and the cooling flow path 51.

In the present exemplary embodiment, the cooling flow path 51 is formed in the separators 15 and 16, but the present disclosure is not limited thereto. For example, a separate member including the cooling flow path may be disposed between the separators.

The fuel cell stack 10 includes an end plate 13 disposed at one end thereof. The end plate 13 includes a fuel inlet 13*a* and a fuel outlet 13*b*. The fuel inlet 13*a* and outlet 13*b* are disposed at opposing corners of the end plate 13 and extend away from the stack 10. Therefore, the fuel inlet 13*a* and the fuel outlet 13*b* are positioned diagonally on the end plate 13. Fuel is injected into the fuel inlet 13*a* and then supplied to the membrane electrode assemblies 12, via fuel flow paths of the anode separators 16.

Figure 3:
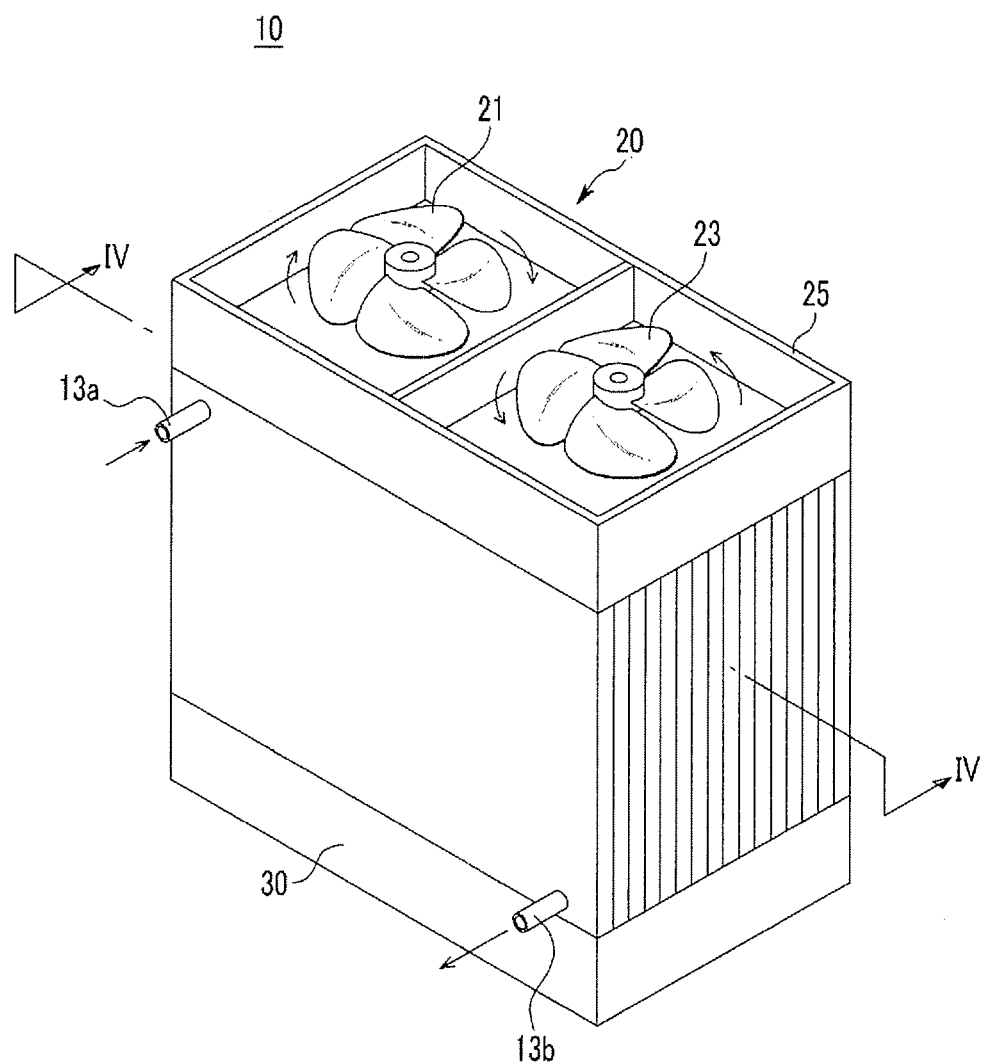
FIG. 3 is a perspective view illustrating the fuel cell stack, according to the first exemplary embodiment of the present disclosure.
Figure 4:
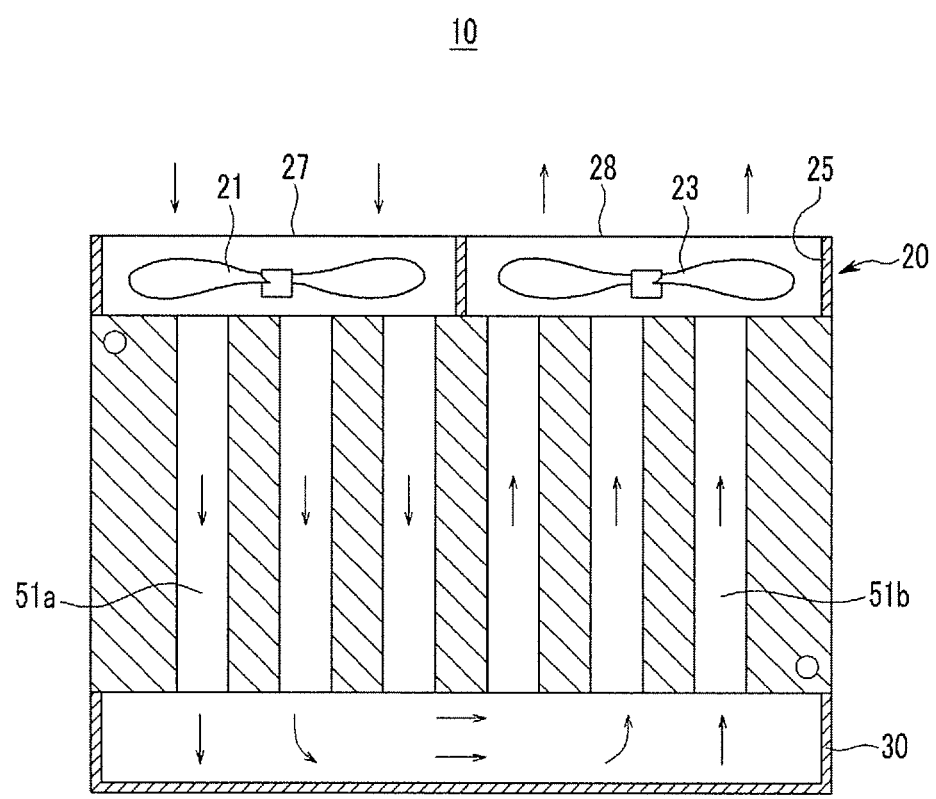
FIG. 4 is a cross-sectional view illustrating some of a fuel cell stack, according to a modified example of the first exemplary embodiment of the present disclosure.

The side of the stack 10 where the fuel inlet 13*a* is positioned receives more heat than the side where the fuel outlet 13*b* is positioned. This is because the fuel is heated in the reformer 45, prior to being supplied to the fuel inlet 13*a*. In addition, the injected fuel is highly concentrated, producing more reaction heat where it is injected into the cells 11. The exchange plate 30 operates to reduce this temperature difference FIG. 3 is a perspective view of the fuel cell stack 10, and FIG. 4 is a cross-sectional view of the fuel cell stack 10, taken along line IV-IV of FIG. 3. Referring to FIGS. 3 and 4, the pump 20 is installed on a first side of the fuel cell stack 10, and the exchange plate 30 is installed on an opposing second side thereof.

The pump 20 includes a frame 25 housing an injection fan 21 and a discharge fan 23. The frame 25 includes an inlet 27 that is opened toward the injection fan 21, and an outlet 28 that is opened toward the discharge fan 23. Here, the injection fan 21 forces coolant (air) into the fuel cell stack 10, and the discharge fan 23 exhausts air from the fuel cell stack 10.

The cooling flow path 51 includes an injection flow path 51*a*, through which air is forced into the exchange plate 30, and a discharge flow path 51*b*, through which air is pulled from the exchange plate 30, to the outlet 28. Air that is forced into the fuel cell stack 10 by the injection fan 21 moves through the injection flow path 51*a* to the exchange plate 30. The air then moves from the exchange plate 30, through the discharge flow path 51 b and is exhausted through the outlet 28. The exchange plate 30 has a channel that provides a fluid communication between the injection flow path 51*a* and the discharge flow path 51*b*. Thus, air that is discharged from the injection flow path 51*a* can be directed to the discharge flow path 51*b*, by the exchange plate 30.

The injection fan 21 and the discharge fan 23 circulate air through the cooling flow path 51. In this case, air is forced into a portion of the stack 10 having a larger heating value, and air is exhausted from a portion of the stack 10 having a smaller heating value. Therefore, a temperature deviation of the fuel cell stack 10 is reduced.

Particularly, if the fuel inlet side of the fuel cell stack 10 has a higher temperature than the fuel outlet side, increased water condensation occurs at the fuel outlet side. Thus, a voltage imbalance may occur, resulting in a reduction in the performance. However, in the present exemplary embodiment, the injection flow path 51*a* is formed in a portion that is adjacent to the fuel inlet, and the discharge flow path 51*b* is formed in a portion that is adjacent to the fuel outlet. Therefore, the overall temperature deviation throughout the fuel cell stack 10 can be reduced.

The direction of air flow through injection flow path 51*a* and the discharge flow path 51*b* can be set by adjusting the rotation direction of the fans 21 and 23. Compared with a convention case, where two fans are rotated in the same direction, an air injection area is reduced. However, when the injection fan 21 and the discharge fan 23 are installed, the air flow rate increases, resulting in increased cooling stability.

Figure 10A:
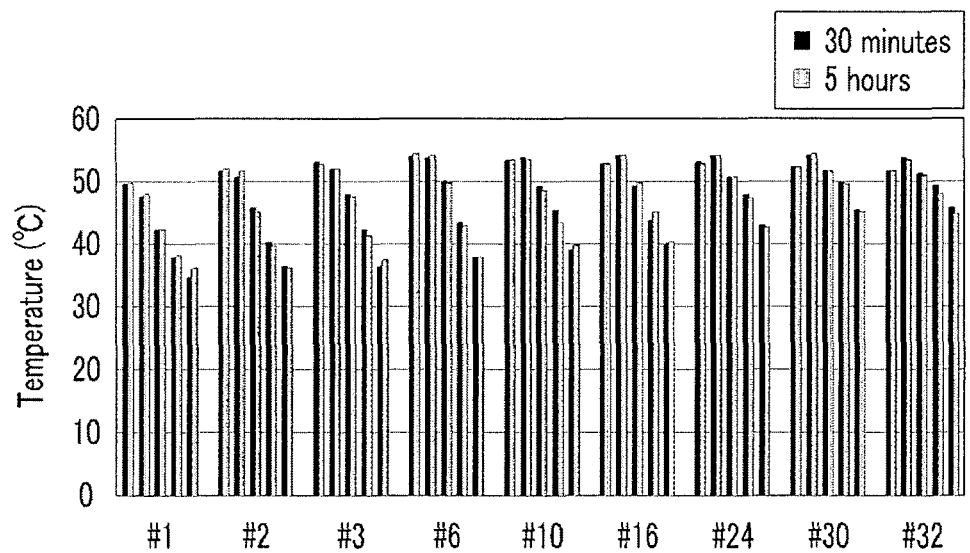
FIG. 10A is a graph illustrating a temperature distribution of a conventional fuel cell stack.
Figure 10B:
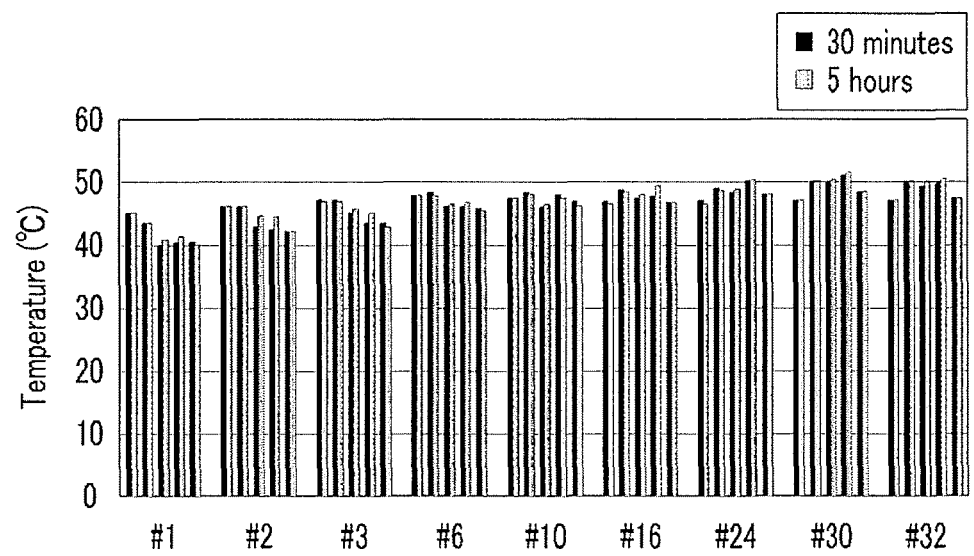
FIG. 10B is a graph illustrating a temperature distribution of a fuel cell stack, according to the first exemplary embodiment of the present disclosure.

FIG. 10A is a graph illustrating a temperature distribution of a conventional fuel cell stack, and FIG. 10B is a graph illustrating a temperature distribution of a fuel cell stack according to the first exemplary embodiment of the present disclosure. Referring to FIGS. 10A and 10B, the temperatures of open cathode-type of fuel cells were measured, and a reformate gas that was heated to 50° C. was supplied as the fuel. The operation voltages of the fuel cell stacks was 20V, and the outputs thereof were 300 W.

Each of The fuel cell stacks was formed with 32 cells, and the temperatures of the first, second, third, sixth, tenth, sixteenth, twenty-fourth, thirtieth, and thirty-second cells were measured, using a fuel inlet as a reference. Further, the temperatures were measured at five points per cell, at a predetermined gap from the fuel inlets and outlets. The temperatures were measured twice, i.e., after 30 minutes and after 5 hours, at the same points.

As shown in FIG. 10A, in the conventional fuel cell stack, it can be seen that the temperature decreased, as a distance from the fuel inlet increased, and the temperature of the inlet side was about 20° C. higher than that of the outlet side. This is due to higher reaction rates and fuel temperatures at the fuel inlet side, and a uniform supply of air to the entire stack.

If the temperature is not uniform, water condensation occurs in lower temperature areas. Thus, a voltage imbalance occurs and overall performance is reduced. However, in FIG. 10B, it can be seen that the temperature deviation was within 10° C. in the present exemplary embodiment. Therefore, it can be seen that the air flow produced by the injection and discharge fans reduced the temperature deviation of the stack.

Figure 11A:
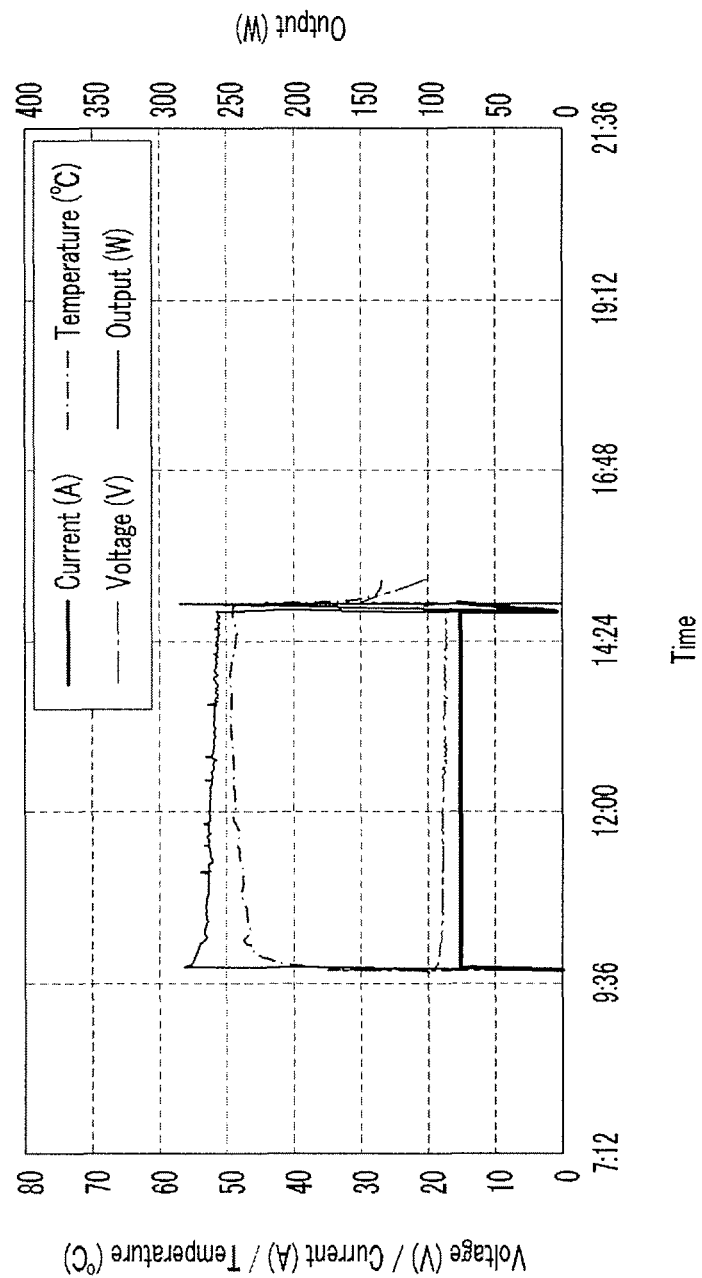
FIG. 11A is a graph illustrating output and performance of a conventional fuel cell stack.
Figure 11B:
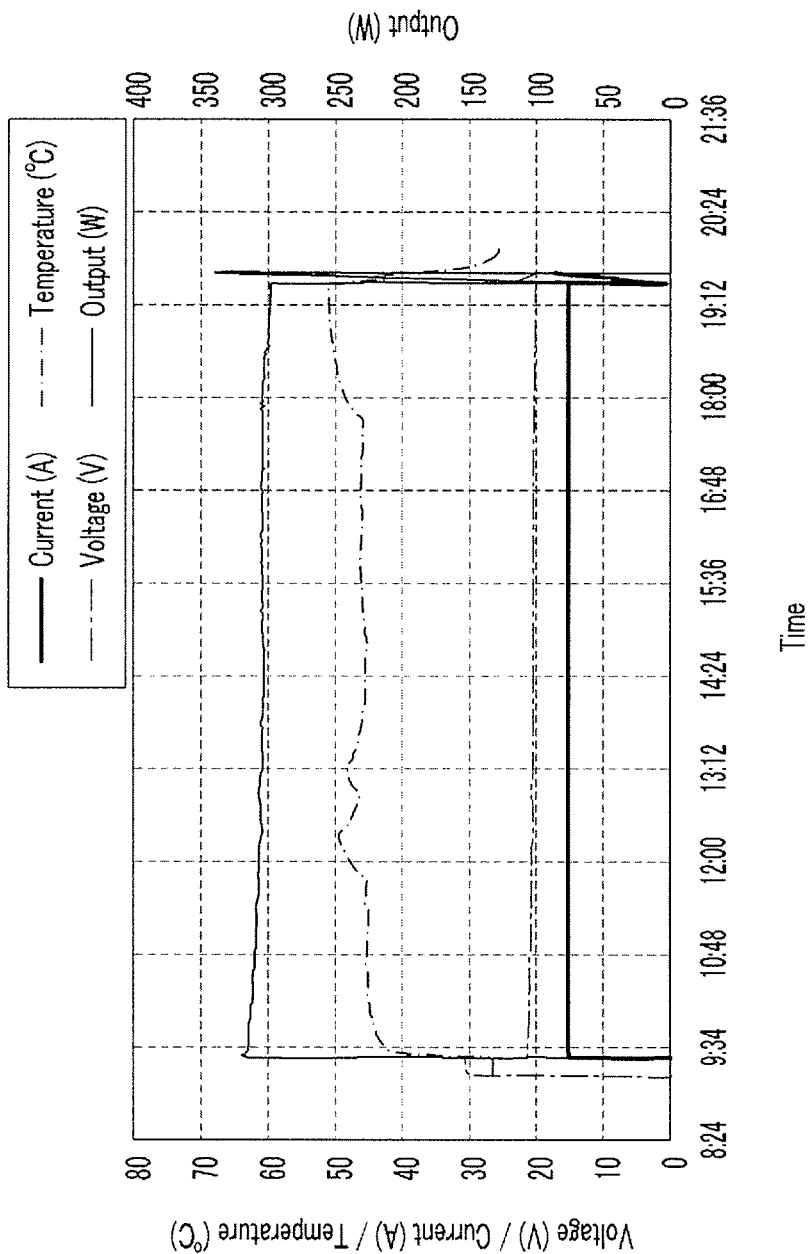
FIG. 11B is a graph illustrating output and performance of a fuel cell stack, according to the first exemplary embodiment of the present disclosure.

FIG. 11A is a graph illustrating the output and performance of a conventional fuel cell stack, and FIG. 11B is a graph illustrating output and performance of a fuel cell stack according to the first exemplary embodiment of the present disclosure. As shown in FIG. 11A, the conventional fuel cell stack operates with an output of less than 300 W and a voltage of less than 20V. Further, a flooding phenomenon occurs after about 5 hours of operation, resulting in a stoppage of operation. This is because the temperature deviation increased within each cell, producing water condensation within a fuel flow path.

However, as shown in FIG. 11B, the fuel cell stack according to the present exemplary embodiment stably operates at 300W and 20V, for 10 hours, which is a target operation time period. As described above, in the fuel cell stack and fuel cell system according to the present exemplary embodiment, by reducing the temperature deviation, flooding is prevented, thereby improving operational stability.

Figure 5:
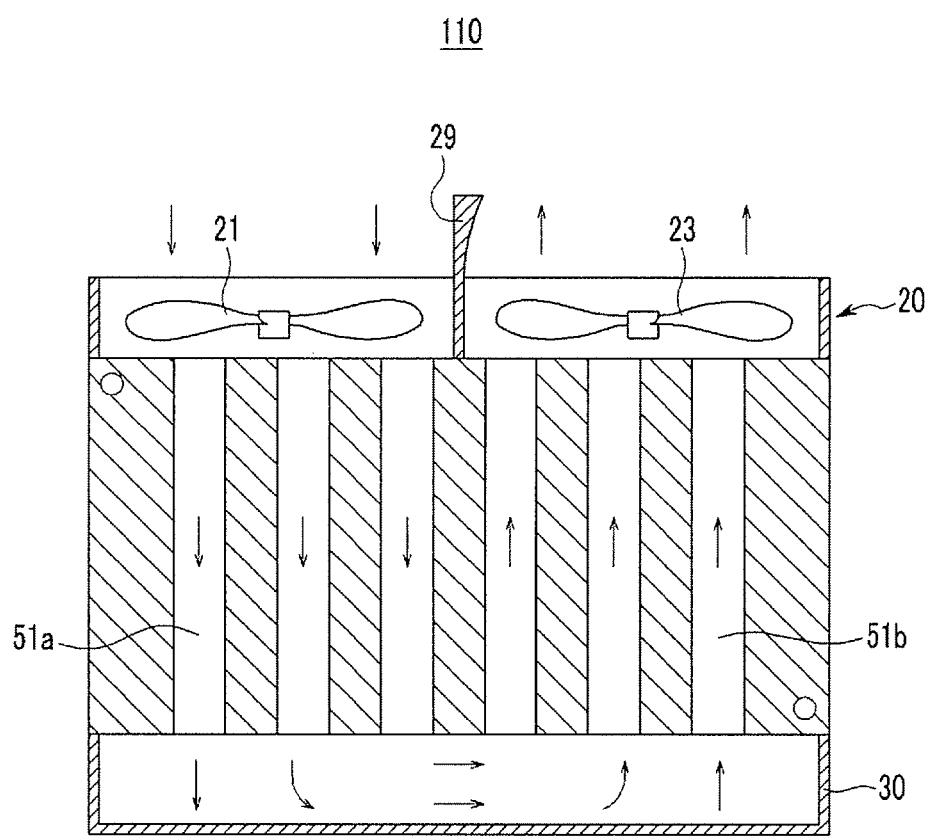
FIG. 5 is a cross-sectional view illustrating a fuel cell stack according to a second exemplary embodiment of the present disclosure.

FIG. 5 is a cross-sectional view illustrating a fuel cell stack 110, according to a second exemplary embodiment of the present disclosure. The fuel cell stack 110 is similar to the fuel cell stack 10, so a detailed description of similar elements will not be repeated. Referring to FIG. 5, the fuel cell stack 110 includes a pump 21 that is installed on a first side of the stack 110 and an exchange plate 30 that is disposed on an opposing second side of the stack 110.

In contrast to the pump 20, the pump 21 also includes a separation plate 29 that extends outwardly between an injection fan 21 and a discharge fan 23. The separation plate 29 prevents hot air that is discharged by the discharge fan 23 from being returned to the fuel cell stack 110, by the injection fan 21.

The separation plate 29 has a curved surface facing the discharge fan 23. Accordingly, air that is discharged by the discharge fan 23 is directed away from the injection fan, to prevent the discharged (heated) air from being pulled into the stack 110 by the injection fan 21.

Figure 6:
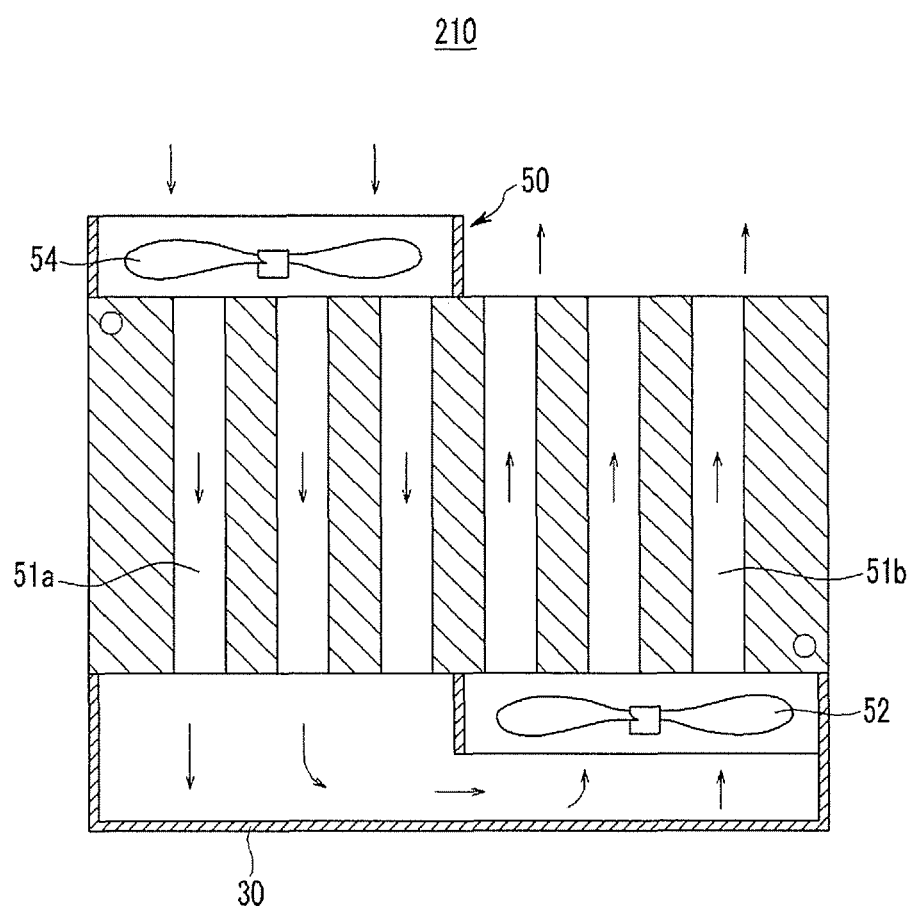
FIG. 6 is a cross-sectional view illustrating a fuel cell stack, according to a third exemplary embodiment of the present disclosure.

FIG. 6 is a cross-sectional view illustrating a fuel cell stack 210, according to a third exemplary embodiment of the present disclosure. The fuel cell stack 210 is similar to the fuel cell stack 10, so a detailed description of similar elements will not be repeated. Referring to FIG. 6, a pump 50 has an injection fan 54 that forces external air into an injection flow path 51a. An exchange plate 30 is formed on a surface of the stack 210 that is opposite to the surface at which the pump 50 is disposed. A circulation fan 52 is disposed within the exchange plate 30, to force air from the exchange plate into a discharge flow path 51b of the stack 210.

The pump 50 and the exchange plate 30 are installed at opposite surfaces of the fuel cell stack 210. The injection flow path 51a is in fluid communication with the injection fan 54, such that the injection fan 54 forces air into the exchange plate 30. The discharge flow path 51b is in fluid communication with the circulation fan 52, such that the circulation fan 52 discharges air from the fuel cell stack 210. Airflow in the injection flow path 51a and the discharge flow path 51b is in different directions. By installing the circulation fan 52 within the exchange plate 30, air that is forced into the exchange plate 30 quickly moves to the discharge flow path 51b, thereby improving cooling efficiency.

Figure 7:
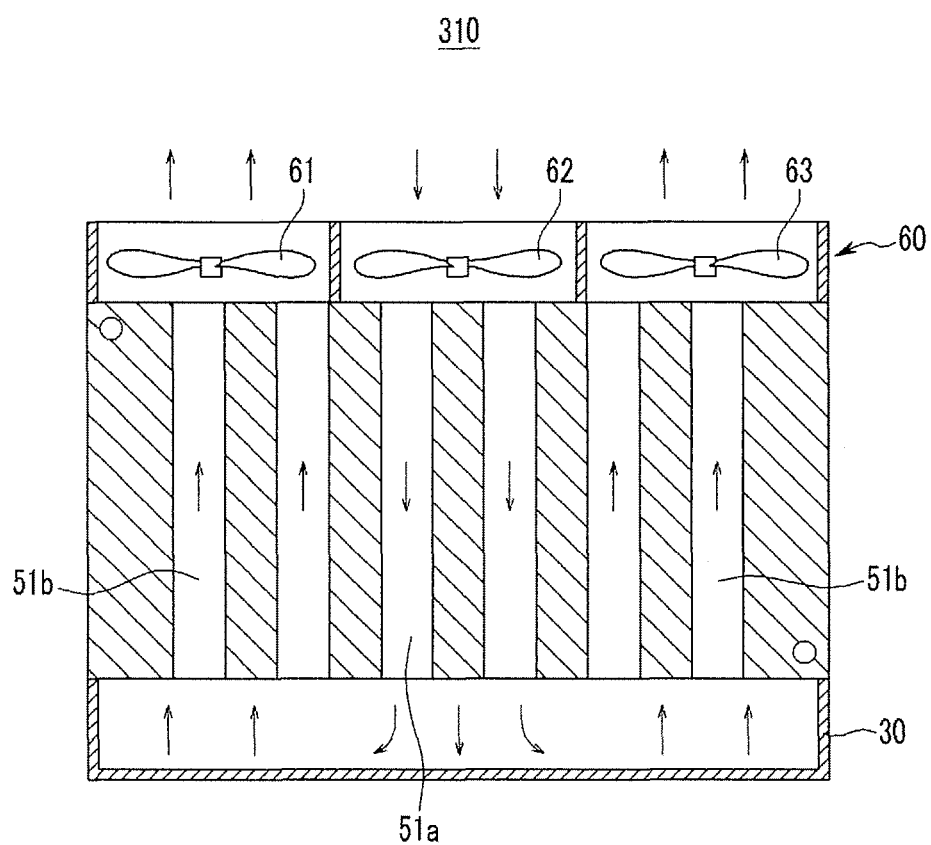
FIG. 7 is a cross-sectional view illustrating a fuel cell stack, according to a fourth exemplary embodiment of the present disclosure.

FIG. 7 is a cross-sectional view illustrating a fuel cell stack 310, according to a fourth exemplary embodiment of the present disclosure. The fuel cell stack 310 is similar to the fuel cell stack 10, so a detailed description of similar elements will not be repeated. Referring to FIG. 7, the fuel cell stack 310 includes stacked cells 11, a pump 60 that is disposed on one surface of the fuel cell stack 310, and an exchange plate 30 that is disposed on an opposing surface of the fuel cell stack 310, opposite to the pump 60.

The pump 60 includes a central injection fan 62 and discharge fans 61 and 63 that are positioned on opposing sides of the injection fan 62. Air is forced into a central portion of the fuel cell stack 310 and is discharged through side portions thereof.

The centrally located injection fan 62 forces air into the exchange plate 30, via the injection flow path 51a. The air is then drawn into the discharge flow path 51b by the discharge fans 61 and 63. In the present exemplary embodiment, the injection fan 62 is installed at the center of the fuel cell stack 310, but the present disclosure is not limited thereto, and a discharge fan may be installed between two injection fans. By effectively discharging heat from a central portion of the fuel cell stack 310, the temperature deviation of the fuel cell stack 310 can be reduced.

Figure 8:
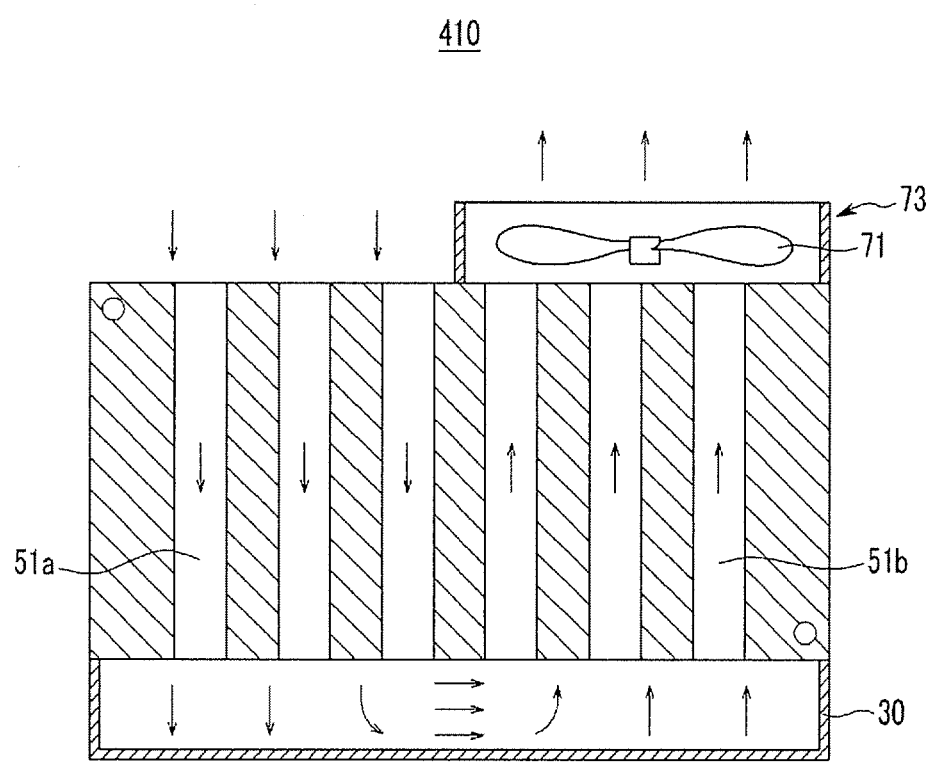
FIG. 8 is a cross-sectional view illustrating a fuel cell stack, according to a fifth exemplary embodiment of the present disclosure.

FIG. 8 is a cross-sectional view illustrating a fuel cell stack 410, according to a fifth exemplary embodiment of the present disclosure. The fuel cell stack 410 is similar to the fuel cell stack 10, so a detailed description of similar elements will not be repeated. Referring to FIG. 8, the fuel cell stack 410 includes a pump 73 that is installed on one side of the stack 410, and an exchange plate 30 that channels air from an injection flow path 51a to a discharge flow path 51b.

The pump 73 includes a discharge fan 71 that discharges air from the stack 410. The discharge fan 71 draws air from the injection flow path 51a, into the exchange plate 30. The air then flows through the exchange plate 30 and is then drawn into the discharge flow path 51b and exhausted from the stack 410. The discharge fan 71 is installed in fluid communication with the discharge flow path 51b, and an end portion of the injection flow path 51a is opened externally.

When the discharge fan 71 rotates, air is externally discharged from the discharge flow path 51b. Thus, a partial vacuum is created in the channel 30, such that external air is pulled into the channel through the injection flow path 51a. According to the present exemplary embodiment, cooling air is sucked to the suction flow path with one fan to discharge it to the discharge flow path. Thus, cooling can be performed using less electric power, as compared to a multi-fan design, which may be suitable for smaller fuel cell stacks.

Figure 9:
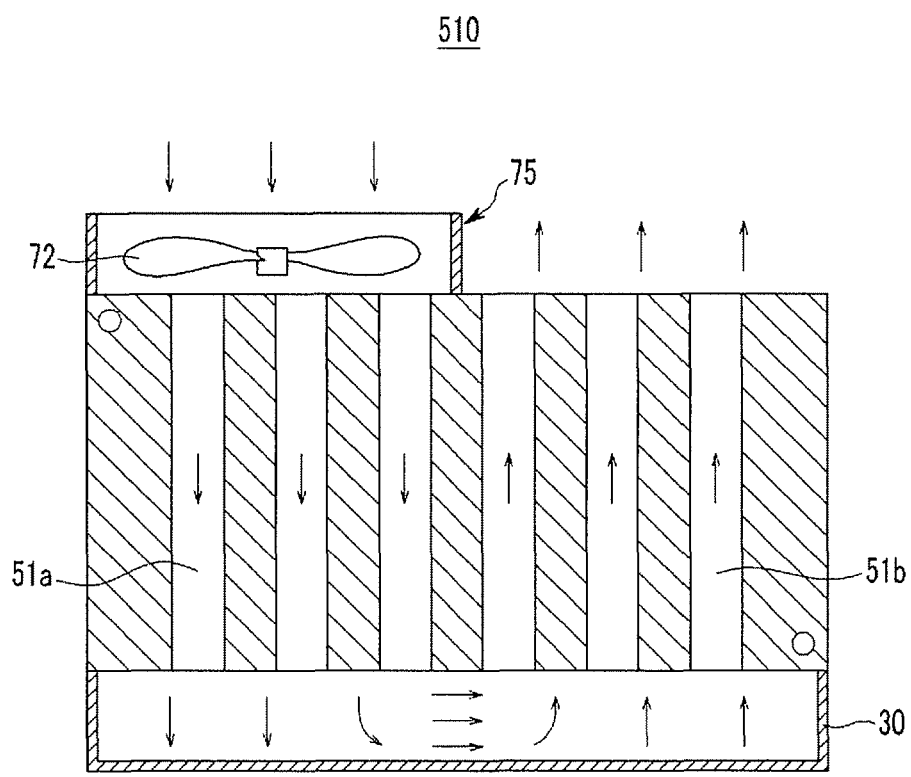
FIG. 9 is a cross-sectional view illustrating a fuel cell stack, according to a sixth exemplary embodiment of the present disclosure.

FIG. 9 is a cross-sectional view illustrating a fuel cell stack 510, according to a sixth exemplary embodiment of the present disclosure. The fuel cell stack 510 is similar to the fuel cell stack 10, so a detailed description of similar elements will not be repeated. Referring to FIG. 9, the fuel cell stack 510 includes a pump 75 that is installed at a surface of the stack 510, and an exchange plate 30 that channels air from an injection flow path 51a to a discharge flow path 51b.

The pump 75 includes an injection fan 72 that forces air into the injection flow path 51a, through the exchange plate 30 and into the discharge flow path 51b, where it is externally discharged. The injection fan 72 is installed to be in fluid communication with the injection flow path 51a, and an end portion of the discharge flow path 51b is open. Accordingly, this exemplary embodiment may be applicable to a smaller fuel cell stack and may use less electric power than a multi-fan design.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents.

What is claimed is:

1. A fuel cell stack comprising:
   a stack of cells configured to generate electricity by oxidizing a fuel;
   an exchange plate disposed on a first side of the stack, the exchange plate having a channel disposed in fluid communication with an injection flow path extending between the cells and a discharge flow path extending between the cells; and
   a pump disposed at an opposing second side of the stack, the pump being configured to:
   supply an oxidizing agent to the stack of cells: and
   increase coolant flow
   from the second side of the stack to the first side of the stack within the injection flow path,
   from the injection flow path to the discharge flow path within the exchange plate, and
   from the first side to the second side within the discharge flow path, wherein the injection flow path is disposed adjacent to a third side of the stack into which the fuel is injected; and the discharge flow path is disposed adjacent to a fourth side of the stack from which the fuel is discharged.

2. The fuel cell stack of claim 1, wherein the pump comprises:
   an injection fan to force the coolant through the injection flow path; and
   a discharge fan to force the coolant through the discharge flow path.

3. The fuel cell stack of claim 2, wherein the injection fan and the discharge fan rotate in different directions to circulate coolant through the stack.

4. The fuel cell stack of claim 1, wherein the pump comprises:
   an injection fan disposed at a central portion of the fuel cell stack; and
   discharge fans disposed at opposing sides of the injection fan.

5. The fuel cell stack of claim 2, wherein the pump further comprises a separation plate that extends between the injection fan and the discharge fan, having a curved surface that deflects coolant discharged by the discharge fan, away from the injection fan.

6. The fuel cell stack of claim 1, further comprising a circulation fan disposed within the exchange plate, to force coolant through the discharge flow path.

7. The fuel cell stack of claim 1, wherein the pump comprises an injection fan to force the coolant through the injection flow path.

8. The fuel cell stack of claim 1, wherein the pump comprises a discharge fan to force coolant through the discharge flow path.

9. The fuel cell stack of claim 1, wherein the pump and the exchange plate are disposed on opposite sides of the stack.

10. A fuel cell system comprising:
    a fuel cell stack comprising:
       stacked cells configured to generate electricity by oxidizing a fuel;
       an exchange plate disposed on a first side of the stack, the exchange plate having a channel in fluid communication with an injection flow path extending between the cells and a discharge flow path extending between the cells; and
    a pump disposed at an opposing second side of the stack, the pump being configured to:
       supply an oxidizing agent to the stacked cells; and
       force coolant
          from the second side of the stack to the first side of the stack through the injection flow path,
          from the injection flow path to the discharge flow path through the exchange plate, and
          from the first side of the stack to the second side through the discharge flow path; and
    a fuel supply unit configured to supply the fuel to the stack, wherein the injection flow path is disposed adjacent to a third side of the stack into which the fuel is injected; and the discharge flow path is disposed adjacent to a fourth side of the stack from which the fuel is discharged.

11. The fuel cell system of claim 10, further comprising a reformer disposed between the fuel supply unit and the stack, to reform the fuel into reformate gas.

12. The fuel cell system of claim 10, wherein the pump comprises:
    an injection fan to force the coolant through the injection flow path; and
    a discharge fan to force the coolant through the discharge flow path.

13. The fuel cell system of claim 10, wherein the pump comprises:
    an injection fan disposed at a central portion of the stack; and
    discharge fans disposed on opposing sides of the injection fan.

14. The fuel cell system of claim 12, wherein the pump further comprises a separation plate that extends between the injection fan and the discharge fan, having a curved surface that deflects coolant discharged by the discharge fan, away from the injection fan.

15. The fuel cell system of claim 10, wherein the fuel cell stack further comprises a circulation fan disposed within the exchange plate, to force coolant through the discharge flow path.

16. The fuel cell system of claim 10, wherein the pump comprises an injection fan to force coolant through the injection flow path.

17. The fuel cell system of claim 10, wherein the pump comprises a discharge fan to force coolant through the discharge flow path.

* * * * *